(12) United States Patent
Chian (10) Patent No.: US 6,667,594 B2
(45) Date of Patent: Dec. 23, 2003

(54) DETERMINATION OF MAXIMUM TRAVEL OF LINEAR ACTUATOR

(75) Inventor: Brent Chian, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 74 days.

(21) Appl. No.: 09/947,627

(22) Filed: Sep. 6, 2001

(65) Prior Publication Data

US 2002/0030461 A1 Mar. 14, 2002

Related U.S. Application Data

(63) Continuation-in-part of application No. 09/447,362, filed on Nov. 23, 1999, now abandoned.

(51) Int. Cl.$^7$ ................................................. H02P 8/00
(52) U.S. Cl. ...................... 318/696; 318/685; 318/138; 318/254; 318/439
(58) Field of Search .................... 318/685, 696, 318/138, 254, 439

(56) References Cited

U.S. PATENT DOCUMENTS

| | | | |
|---|---|---|---|
| 4,282,471 A | 8/1981 | Budniak et al. | 318/685 |
| 4,683,413 A | 7/1987 | Bax | 318/779 |
| 4,739,239 A | 4/1988 | Krause et al. | 318/685 |
| 4,790,233 A | 12/1988 | Backe et al. | 91/361 |
| 5,079,653 A | 1/1992 | Gauthier et al. | 360/78.13 |
| 5,797,374 A | 8/1998 | Minagawa et al. | 123/497 |
| 6,262,554 B1 | 7/2001 | Kojima et al. | 318/685 |
| 6,404,154 B2 * | 6/2002 | Marcinkiewicz et al. | 318/254 |
| 6,419,478 B1 | 7/2002 | Kemp | 431/12 |

* cited by examiner

Primary Examiner—Karen Masih (57) ABSTRACT

An apparatus for and method of monitoring the operation of a stepper motor used to control the main burner valve of a gas appliance by positioning a linear actuator. The gas appliance has a pilot burner. A thermopile thermally coupled to said pilot burner produces an electrical output which powers the stepper motor and a control microprocessor. The control microprocessor monitors the waveforms of potential induced by rotational motion into the unenergized stator coils of the stepper motor. By analyzing the waveforms, the microprocessor can monitor the start time, stop time, direction of the rotational motion, and maximum length of travel of the linear actuator.

26 Claims, 8 Drawing Sheets

DETERMINATION OF MAXIMUM TRAVEL OF LINEAR ACTUATOR

RELATED APPLICATION

The instant application is a continuation-in-part of U.S. patent application Ser. No. 09/447,362, filed Nov. 23, 1999 abandon.

CROSS REFERENCE TO CO-PENDING APPLICATIONS

U.S. patent application Ser. No. 09/447,611, filed Nov. 23, 1999, and entitled, "LOW INPUT VOLTAGE, LOW COST, MICRO-POWER DC—DC CONVERTER"; U.S. patent application Ser. No. 09/447,999, filed Nov. 23, 1999, and entitled, "STEPPER MOTOR DRIVING A LINEAR ACTUATOR OPERATING A PRESSURE CONTROL REGULATOR"; U.S. patent application Ser. No. 09/447,612, filed Nov. 23, 1999, and entitled, "LOW INPUT VOLTAGE, HIGH EFFICIENCY, DUAL OUTPUT DC TO DC CONVERTER"; U.S. patent application Ser. No. 09/450,077, filed Nov. 29, 1999, and entitled, "MOTOR STEP-LESS SPEED CONTROL WITH ACTIVE FEEDBACK OF PHASE DETECTOR"; U.S. patent application Ser. No. 09/450,078, filed Nov. 29, 1999, and entitled, "ELECTRONIC CONVERTIBILITY SELECTION", and U.S. patent application Ser. No. 09/448,000, filed Nov. 23, 1999, and entitled, "ELECTRONIC DETECTING OF FLAME LOSS BY SENSING POWER OUTPUT FROM THERMOPILE" are commonly assigned co-pending applications incorporated herein by reference.

BACKGROUND OF THE INVENTION

1. Field of the Invention

The present invention generally relates to systems for control of a gas appliance and more particularly relates to electronic control of the main burner.

2. Description of the Prior Art

It is known in the art to employ various appliances for household and industrial applications which utilize a fuel such as natural gas (i.e., methane), propane, or similar gaseous hydrocarbons. Typically, such appliances have the primary heat supplied by a main burner with a substantial pressurized gas input regulated via a main valve. Ordinarily, the main burner consumes so much fuel and generates so much heat that the main burner is ignited only as necessary. At other times (e.g., the appliance is not used, etc.), the main valve is closed extinguishing the main burner flame.

A customary approach to reigniting the main burner whenever needed is through the use of a pilot light. The pilot light is a second, much smaller burner, having a small pressurized gas input regulated via a pilot valve. In most installations, the pilot light is intended to burn perpetually. Thus, turning the main valve on provides fuel to the main burner which is quickly ignited by the pilot light flame. Turning the main valve off, extinguishes the main burner, which can readily be reignited by the presence of the pilot light.

These fuels, being toxic and highly flammable, are particularly dangerous in a gaseous state if released into the ambient. Therefore, it is customary to provide certain safety features for ensuring that the pilot valve and main valve are never open when a flame is not present preventing release of the fuel into the atmosphere. A standard approach uses a thermogenerative electrical device (e.g., thermocouple, thermopile, etc.) in close proximity to the properly operating flame. Whenever the corresponding flame is present, the thermocouple generates a current. A solenoid operated portion of the pilot valve and the main valve require the presence of a current from the thermocouple to maintain the corresponding valve in the open position. Therefore, if no flame is present and the thermocouple(s) is cold and not generating current, neither the pilot valve nor the main valve will release any fuel.

In practice, the pilot light is ignited infrequently such as at installation, loss of fuel supply, etc. Ignition is accomplished by manually overriding the safety feature and holding the pilot valve open while the pilot light is lit using a match or piezo igniter. The manual override is held until the heat from the pilot flame is sufficient to cause the thermocouple to generate enough current to hold the safety solenoid. The pilot valve remains open as long as the thermocouple continues to generate sufficient current to actuate the pilot valve solenoid.

The safety thermocouple(s) can be replaced with a thermopile(s) for generation of additional electrical power. This additional power may be desired for operating various control circuitry of equipment auxiliary to the gas appliance. Normally, this requires conversion of the electrical energy produced by the thermopile to a voltage useful to these additional loads. Though not suitable for this application, U.S. Pat. No. 5,822,200 issued to Stasz; U.S. Pat. No. 5,804,950, issued to Hwang et al.; U.S. Pat. No. 5,381,298, issued to Shaw et al.; U.S. Pat. No. 4,014,165, issued to Barton; and U.S. Pat. No. 3,992,585, issued to Turner et al. all discuss some form of voltage conversion.

Upon loss of flame (e.g., from loss of fuel pressure), the thermocouple(s) ceases generating electrical power and the pilot valve and main valve are closed, of course, in keeping with normal safety requirements. Yet this function involves only a binary result (i.e., valve completely on or valve completely off). Though it is common within vehicles, such as automobiles, to provide variable fuel valve control as discussed in U.S. Pat. No. 5,546,908, issued to Stokes, and U.S. Pat. No. 5,311,849, issued to Lambert et al., it is normal to provide static gas appliances with a simple on or off valve.

Yet, there are occasions when it is desirable to adjust the main burner supply valve of a standard gas appliance. These include changes in mode (i.e., changes in the desired intensity of the flame) and changes in the fuel type (e.g., change from propane to methane). Whereas some appliances have manual valves, it would be desirable to have electronically controlled valves.

SUMMARY OF THE INVENTION

The present invention overcomes the disadvantages of the prior art by providing a main burner valve for a gas appliance which is precisely controllable. Furthermore, the present invention has a valve system totally powered from the pilot light flame. The valve assembly of the present invention is electronically monitored to ensure proper operation and to conserve electrical power.

In accordance with the preferred mode of the present invention, a thermopile is thermally coupled to the pilot flame. As current is generated by the thermopile, it is converted via a DC-to-DC converter to a regulated output and an unregulated output. The regulated output powers a microprocessor and other electronic circuitry which control operation of the main fuel valve, remote communication with the operator, and speed of the circulating fan. The unregulated output powers various mechanical components including a stepper motor which controls the main burner valve.

The stepper motor is mechanically coupled to a linear actuator which precisely positions the main fuel valve. The use of the stepper motor means that any selected valve position is held statically by the internal rachet action of the stepper motor without quiescent consumption of any electrical energy. That makes the electrical duty cycle of the stepper motor/valve positioning system extremely low. This is a very important feature which permits the system to operate under the power of the thermopile without any necessary external electrical power source. In fact, the stepper motor duty cycle is sufficiently low, that the power supply can charge a capacitor slowly over time such that when needed, that capacitor can power the stepper motor to change the position of the linear valve actuator.

A particularly important feature of the present invention is the monitoring of the stepper motor operation. When the system tries to move the stepper motor, it does not have any feedback to confirm stepper movement. There are three reasons why detection of stepper movement is needed:

1. When performing the self-calibration (see electronic convertibility disclosure), it is necessary to drive the stepper to a hard stop position. As there is no motion or position detector (to save cost and power), the present invention is capable of detecting at which driving pulse stepper stops movement.
2. During normal flame height modulation, as the stepper is driven with a voltage lower than specified voltage, the stepper may stop. It is necessary to detect any slippage.
3. As soon as stepper movement is detected, the driving pulse may be terminated early to conserve power.

The stepper motor has four stator coils arranged about the four rotational quadrants. For most movements of the stepper motor, only a single coil is utilized and in no case are more than two used. Thus, whenever the stepper motor is in motion, at least two of the four coils are unused. An electrical potential is induced into the unused coils as a result of the rotational movement of the permanent rotor magnets of the stepper motor. By monitoring these signals and analyzing them, certain characteristic signatures are revealed. Thus, the microprocessor can verify that motion has actually occurred, can determine the direction of the motion, and can ascertain when the motion has been completed. In this way, the microprocessor can increase safety and decrease power consumption.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
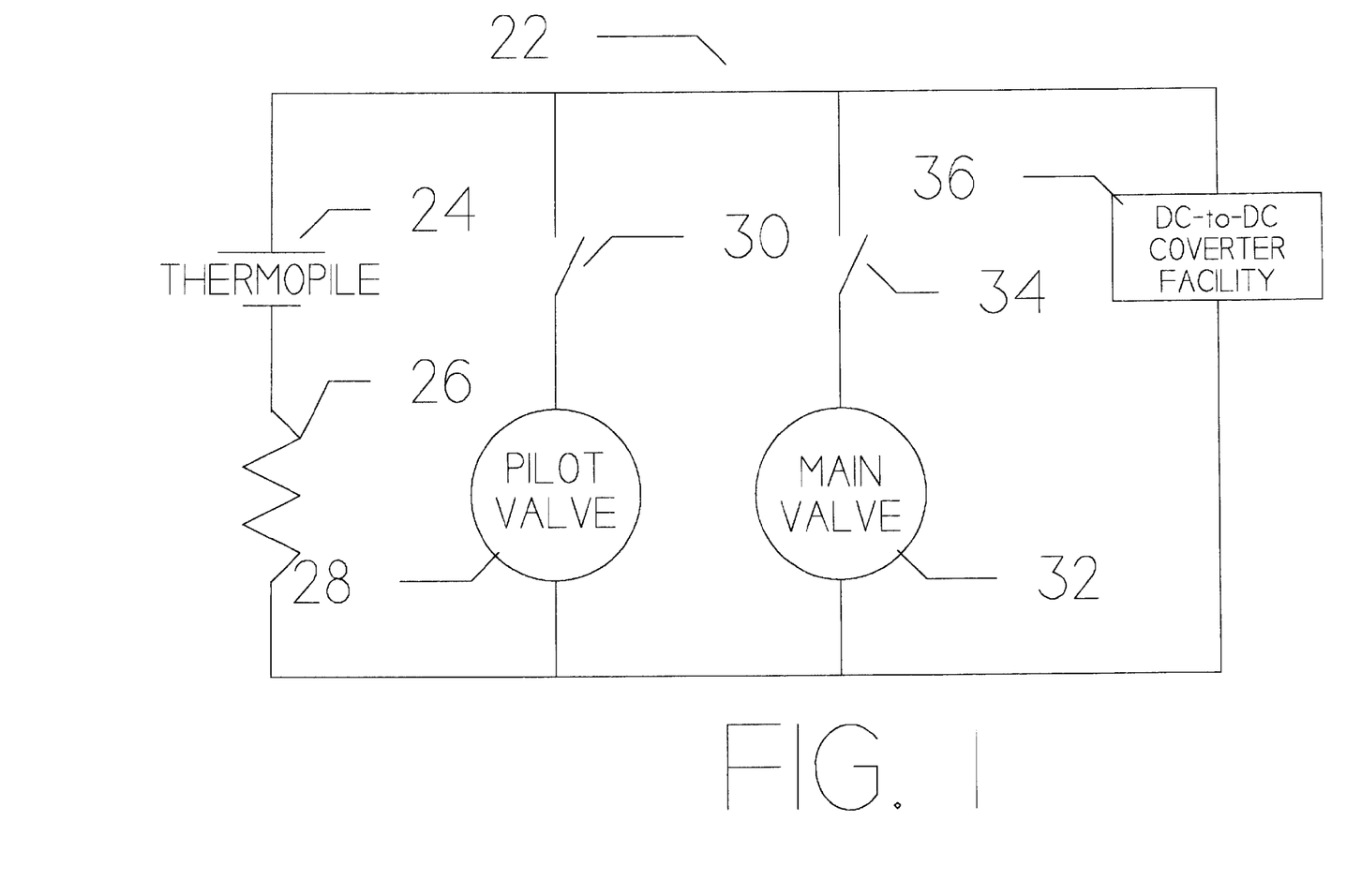
FIG. 1 is a simplified electrical schematic diagram of the present invention.

FIG. 1 is a very basic electrical diagram 22 of the power circuitry of the present invention. Thermopile 24 is structured in accordance with the prior art. Resistor 26 represents the internal resistance of thermopile 24.

Pilot valve 28 has a solenoid (not separately shown) which holds the pilot valve open whenever sufficient current flows through the circuit. Similarly, the internal solenoid (also not separately shown) of main valve 32 holds the main valve open whenever sufficient current flows through the associated circuit.

DC-to-DC conversion facility 36 converts the relatively low voltage output of thermopile 24 to a sufficiently large voltage to power the electronic control circuitry, including the microprocessor. In accordance with the preferred mode of the present invention, DC-to-DC conversion facility 36 consists of two DC-to-DC converters. The first converter operates at the extremely low thermopile output voltages experienced during combustion chamber warm up to generate a higher voltage to start the high-efficiency, second DC-to-DC converter. The other DC-to-DC converter, once started, can keep converting at much lower input voltage and generate much more power from the limited thermopile output for the system during normal operation. A more detailed description of the second device is available in the above identified and incorporated, commonly assigned, co-pending U.S. patent applications.

Figure 2:
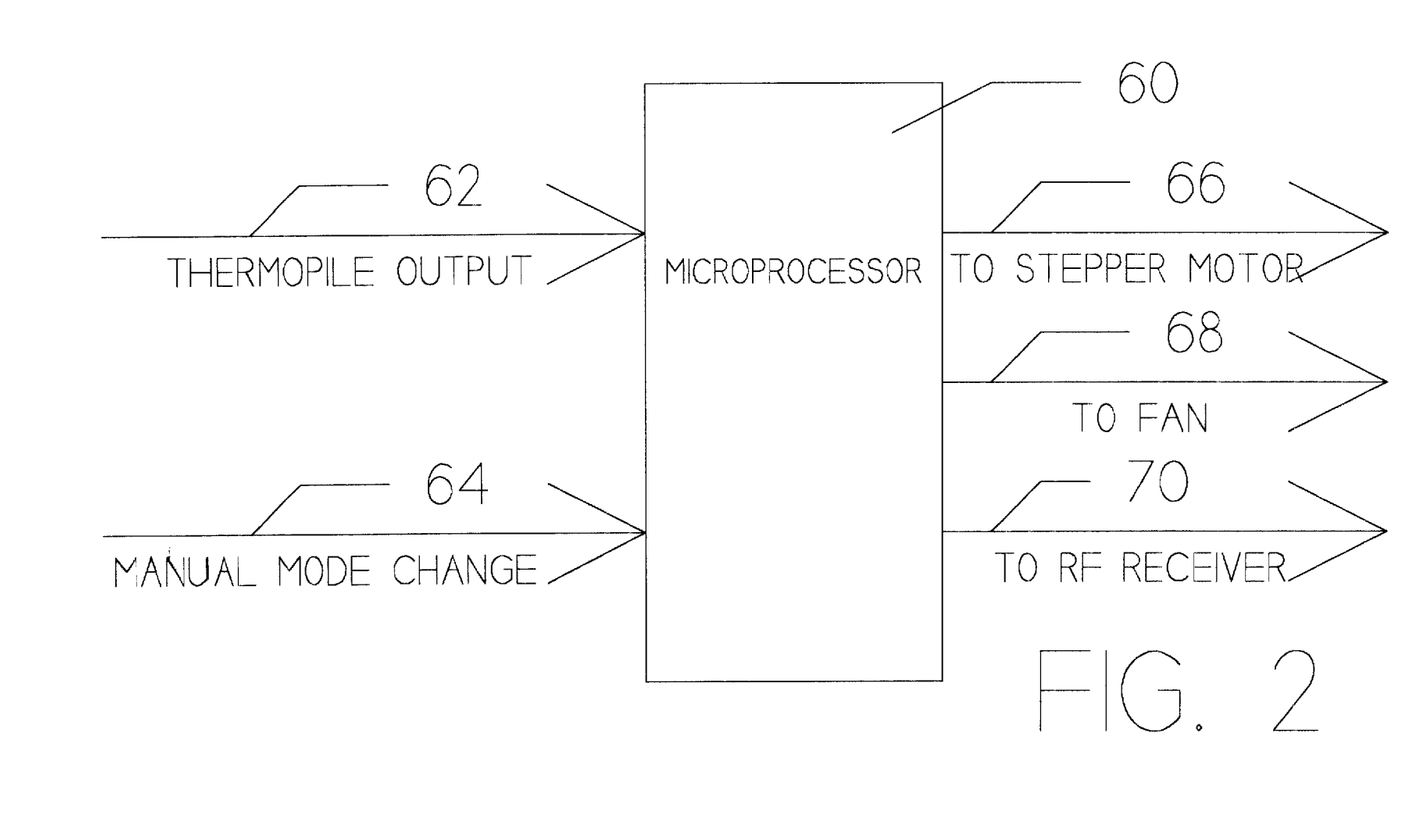
FIG. 2 is a simplified block diagram of the microprocessor circuit.

FIG. 2 is a simplified diagram showing the basic inputs and outputs of microprocessor 60. In the preferred mode, microprocessor 60 is an 8-bit AVR model AT90LS8535 microprocessor available from ATMEL. It is a high performance, low power, restricted instruction set (i.e., RISC) microprocessor. In the preferred mode, microprocessor 60 is clocked at one megahertz to save power, even though the selected device may be clocked at up to four megahertz.

The two primary inputs to microprocessor 60 are the thermopile output voltage received via input 62 and the manual mode change information received via input 64. The thermopile output voltage is sampled once per second. The mode change information, on the other hand, is received aperiodically in response to manual action by the user.

Output 66 controls operation of the stepper motor. Output 68 controls an external circulation fan. Output 70 controls the radio frequency receiver through which an operator can communicate via a remote control device.

Figure 3:
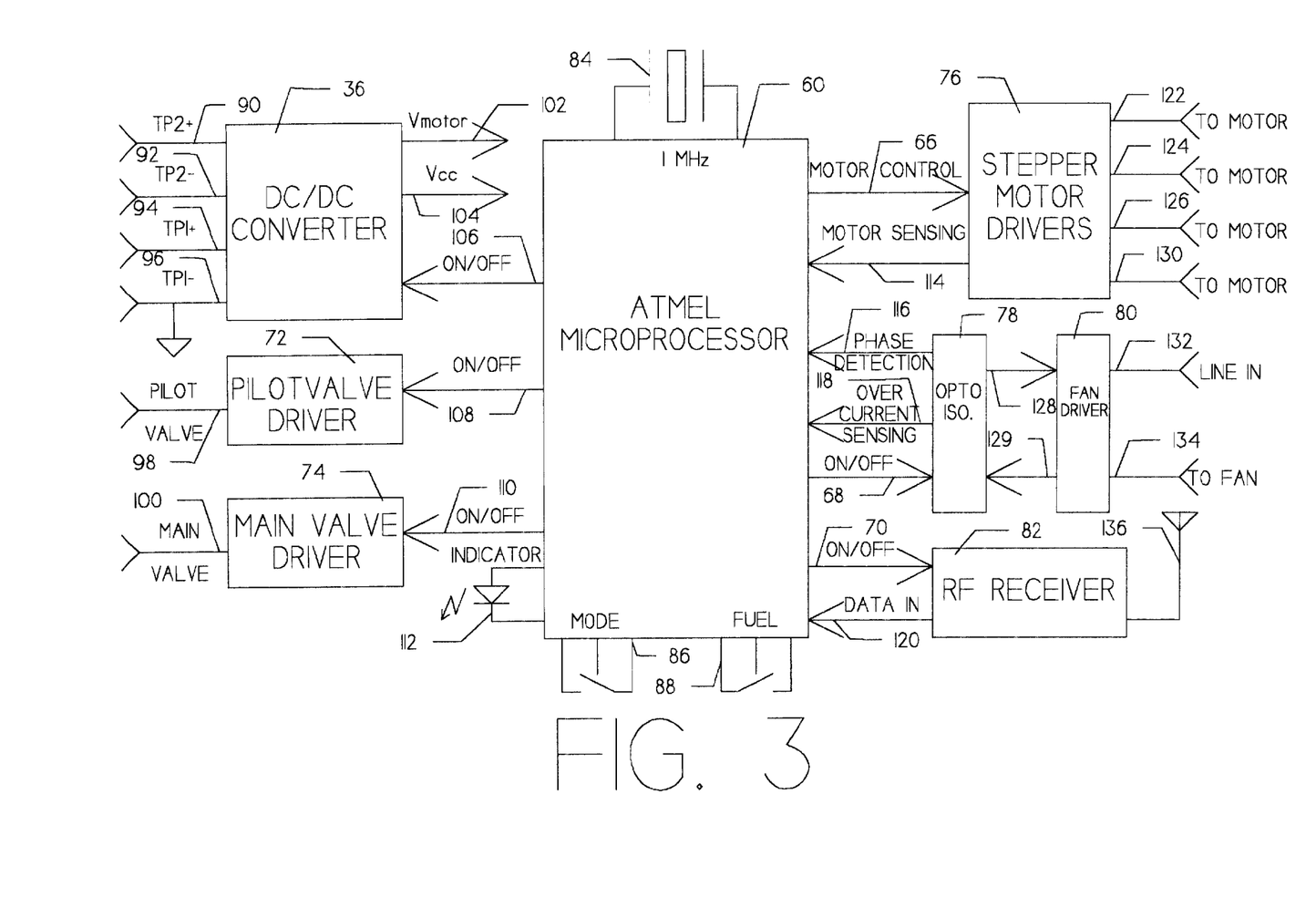
FIG. 3 is a detailed block diagram of the microprocessor of the present invention.

FIG. 3 is a detailed block diagram of the inputs and outputs of microprocessor 60. One megahertz crystal 84 clocks microprocessor 60. The output of crystal 84 is also divided down to provide an interrupt to microprocessor 60 once per second. This interval is utilized for sampling of the thermopile output voltage Indicator 112 permits early notification of flame on to the user.

Manual mode switch 86 permits an operator to select local mode or remote mode. In local mode the main valve stays open and in high flame position, and the fan runs at full speed. In remote mode, a remote transmitter or remote thermostat can control the main valve on/off, set the flame height, and select fan speed. Similarly, manual switch 88 is used to inform the microprocessor of the fuel type, so that the main valve outlet pressure can be adjusted. Each of these alternative switch positions cause microprocessor 60 to consult a particular corresponding entry within the valve positioning table stored in the non-volatile memory of microprocessor 60. These entries provide the necessary information for microprocessor to direct the stepper motor to set the main burner valve outlet pressure to the proper value. The method for determining the valve positioning table entries is described in detail in the above identified co-pending patent application.

DC-to-DC converter 36 can receive input from up to two thermopiles. Inputs 94 and 96 provide the positive and negative inputs from the first thermopile, whereas inputs 90 and 92 provide the positive and negative inputs from the second thermopile, respectively. Output 102 is the unregulated output of DC-to-DC converter 36. This output has a voltage varying between about 6 volts and 10 volts. The unregulated output powers the mechanical components, including the stepper motor. Line 104 is a 3 volt regulated output. It powers microprocessor 60 and the most critical electronic components. Line 106 permits microprocessor to turn DC-to-DC converter 36 on and off. This is consistent with the voltage sampling and analysis by microprocessor 60 which predicts flame out conditions.

Line 72 enables and disables pilot valve driver 72 coupled to the pilot valve via line 98. Similarly, line 110 controls main valve driver 74 coupled to the main valve via line 100. This is important because microprocessor 60 can predict flame out conditions and shut down the pilot and main valves long before the output of the thermopile is insufficient to hold the valves open. A more detailed description of this significant feature may be found in the above referenced, co-pending, commonly assigned, and incorporated U.S. patent applications.

Stepper motor drivers 76 are semiconductor switches which permit the output of discrete signals from microprocessor 60 to control the relatively heavy current required to drive the stepper motor. In that way, line 66 controls the stepper motor positioning in accordance with the direction of the microprocessor firmware. Line 114 permits sensing of the stepper motor status which is explained in greater detail below. Lines 122, 124, 126, and 130 provide the actual stepper motor current.

In the preferred mode of practicing the present invention, the gas appliance is a fireplace. The thermopile output is not sufficient to power the desired fan. However, the system can control operation of the fan. Therefore, line 132 provides the external power which is controlled by fan driver 80. Lines 128 and 129 couple to optical isolation device 78 for coupling via lines 68, 116, and 118 to microprocessor 60. Line 134 actually powers the fan.

The fireplace of the preferred mode also has radio frequency remote control. A battery operated transmitter communicates with rf receiver 82 via antenna 136. Lines 70 and 120 provide the interface to microprocessor 60. Rf receiver 82 is powered by the 3 volt regulated output of DC-to-DC converter 36 found on line 104.

Figure 4:
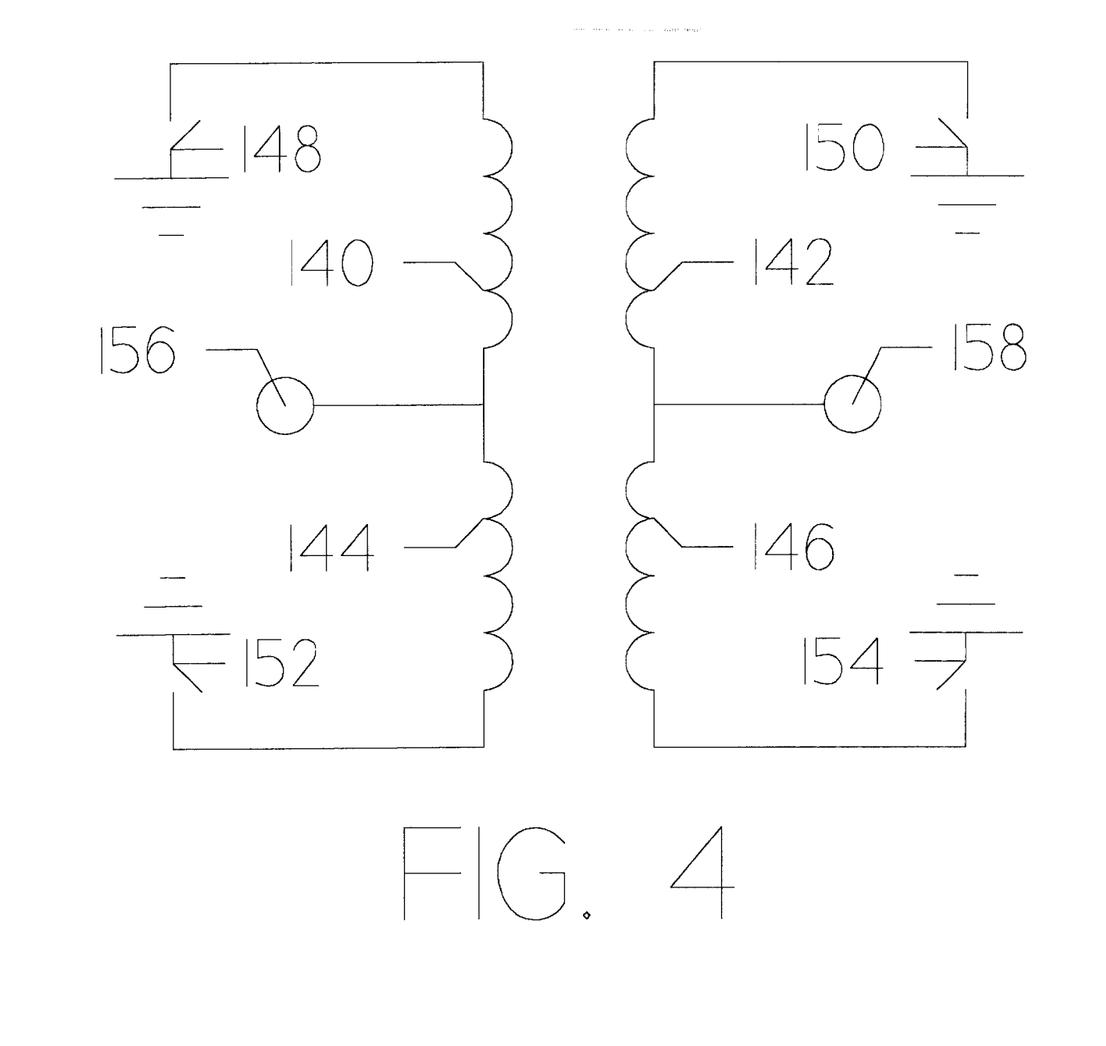
FIG. 4 is a schematic diagram of the stepper motor stator coils.

FIG. 4 is an electrical schematic diagram of the stator coil assembly of the uni-polar stepper motor. Stator coils 140, 142, 144, and 146 are dispersed at 90 degree angles about the rotor of the stepper motor. The stepper motor supply voltage is applied to connectors 156 and 158. Switches 148, 150, 152, and 154 determine which one(s) of the four stator coils is to be energized for a given step motion. These switches are typically found on a commutator which switches the various stator coils on and off depending upon the rotational position of the rotor.

For most step motions, only one or two stator coil(s) is energized. Therefore, at least two stator coils are open during any step motion. These unused stator coils are thus electrically open. An electrical potential is induced across these unused stator coils whenever the permanent magnets of the rotor move. As explained in detail below, these induced potentials permit microprocessor 60 (see also FIG. 3) to monitor operation of the stepper motor.

Figure 5:
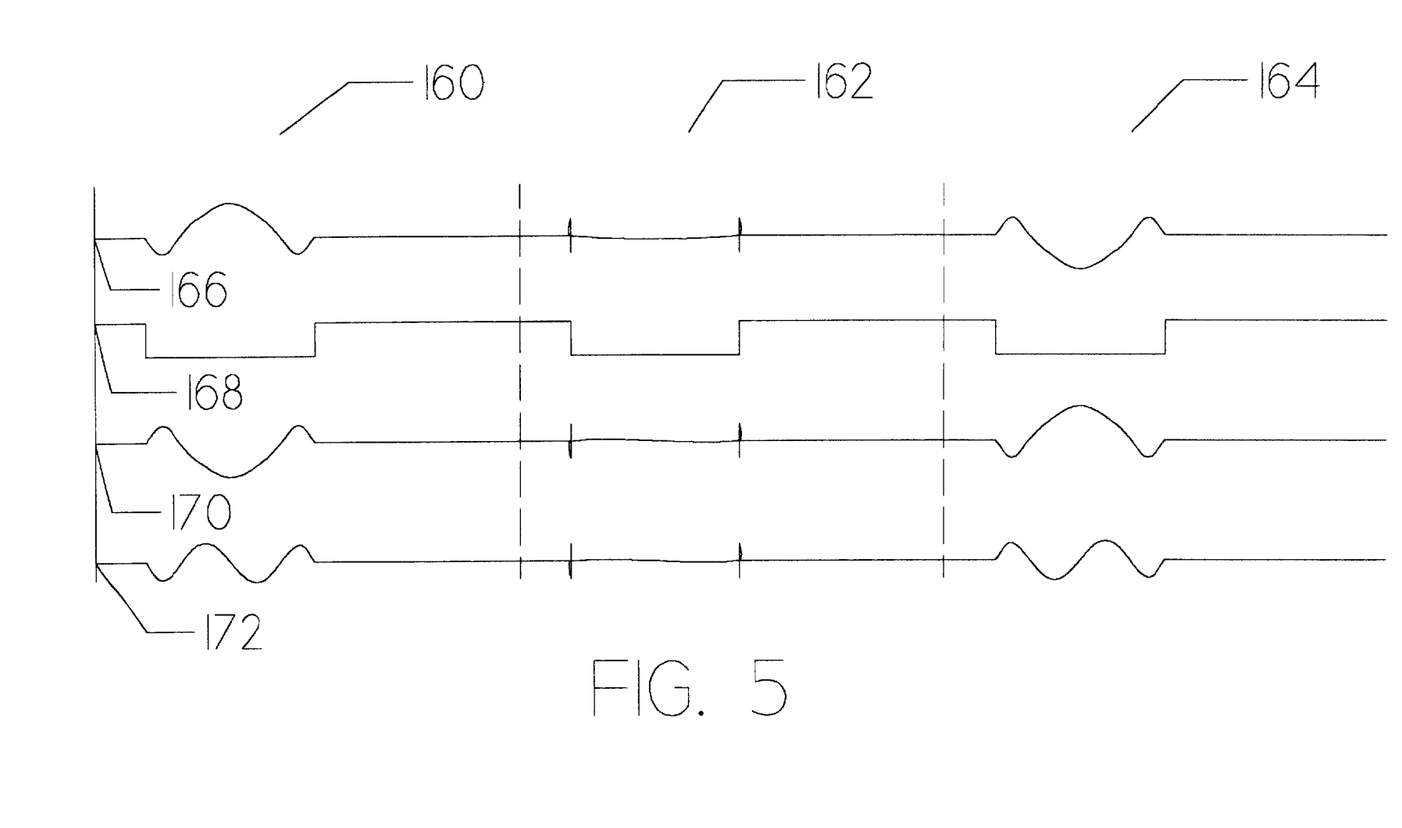
FIG. 5 is a timing diagram of the key signals in monitoring the stepper motor.

FIG. 5 is a timing diagram showing three examples of the induced potentials to be monitored. In each case, stator coil 142 is energized to move the stepper motor within the corresponding quadrant. Example 160 shows forward motion, and example 164 shows reverse motion. Example 162 shows the waveforms associated with no motion.

Waveforms 166, 170, and 172 show the potential across open stator coils 140, 144, and 146, respectively. Waveform 168 shows the drive to selected stator coil 142.

In each of the examples (i.e., 160, 162, and 164), stator coil 142 is driven with the stepper motor drive pulse shown. The forward (or clockwise) motion of the rotor in example 160 induces the characteristic signature in waveform 166 (i.e., stator coil 140) and an opposite characteristic signature in wave form 170 (i.e., stator coil 144). Monitoring and analysis of waveforms 166 and 170 for example 160 indicates a completed forward movement of one step. Because the induced potentials result only from movement of the rotor, the stepper motor drive pulse may be terminated as soon as the potential across stator coils 140 and 144 complete the signature waveform and return to zero. This termination of the stepper motor drive pulse conserves electrical energy of the system.

Example 164 is the same as example 160 with the polarities reversed for the three induced potentials. This reversal signifies a reversal of the rotational motion of the stepper motor. Thus, example 164 shows the waveforms associated with a one step movement in the counterclockwise direction.

The waveforms of example 162 show no movement of the rotor, even though a stepper motor drive pulse has been applied. This may result from a stop at one end of the rotational motion, a stepper motor drive pulse of insufficient energy, or a frozen or malfunctioning rotor. Because there is no rotor motion, there is no induced potential except minimally as a result of the leading and trailing edges of the stepper motor drive pulse.

Figure 6:
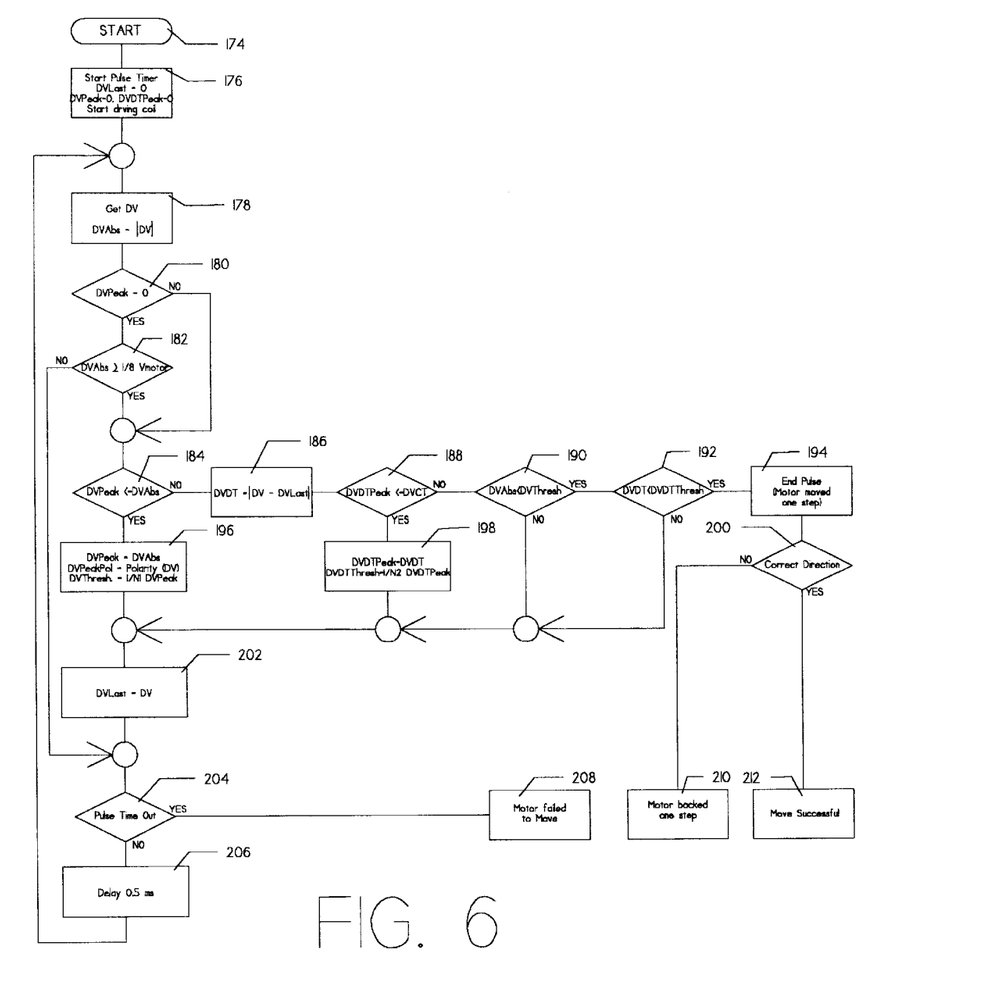
FIG. 6 is a flow chart of the monitoring analysis software.

FIG. 6 is a flowchart of the analysis software which monitors operation of the stepper motor. The analysis begins at element 174. Initialization is performed at element 176.

The differential voltage or DV is obtained at element 178. For the examples shown in FIG. 5 wherein stator coil 142 is energized, DV is defined as the potential difference between stator coil 140 and stator coil 144, the stator coils adjacent to the energized stator coil. A review of the waveforms of FIG. 5 shows that these induced potentials are essentially equal and opposite. Therefore, the resulting DV is increased from the algebraic sum. DV is obtained from the analog-to-digital converter which is built into microprocessor 60. As shown below, a sample is taken.

Elements 180 and 182 determine if the differential voltage has been higher than a start threshold of $\frac{1}{8}$ Vmotor, If no, element 204 determines whether there has been a pulse time out. If yes, control is given to element 208 signifying that a complete drive pulse has been presented and no rotor movement has been detected. If element 204 determines that there has not been a pulse time out, it is not yet time to make a decision. Therefore, element 206 delays for 500 microseconds before resuming the analysis at element 178.

If control is given to element 184, it means that some response has been detected for the current stepper motor drive pulse cycle. Element 184 determines whether the peak differential voltage is yet to be reached, If yes, control is given to elements 196 and 202 for recording the current voltage reading. If element 184 determines that the peak voltage has been reached, control is given to element 186 for calculation of DVDT, which is defined as the absolute value of the current voltage reading minus the previous voltage reading. Element 188 determines if the peak is less than or equal to the calculated DVDT. If yes, element 198 sets the peak to the calculated DVDT and control is given to element 202.

If the peak element 188 determines that the peak is greater than the calculated DVDT, control is given to element 190. It is at element 190 that it is determined whether the absolute value of DV is less than the DV threshold value (i.e., 1/N1 of DVPeak). If no, control is given to element 202 to save the current value and continue sensing. If yes, control is given to element 192 to determine whether the calculated DVDT is less than the DVDT threshold (i.e., 1/N2 of DVDT peak). If no, control is returned to element 202. Otherwise, control is given to element 194 to terminate the stepper motor drive pulse to conserve system electrical power. The direction of rotational motion is determined by element 200. If stepper moved in the intended direction, F control is given to element 212. If the stepper moved in the opposite of the intended direction, control is given to element 210.

Figure 7:
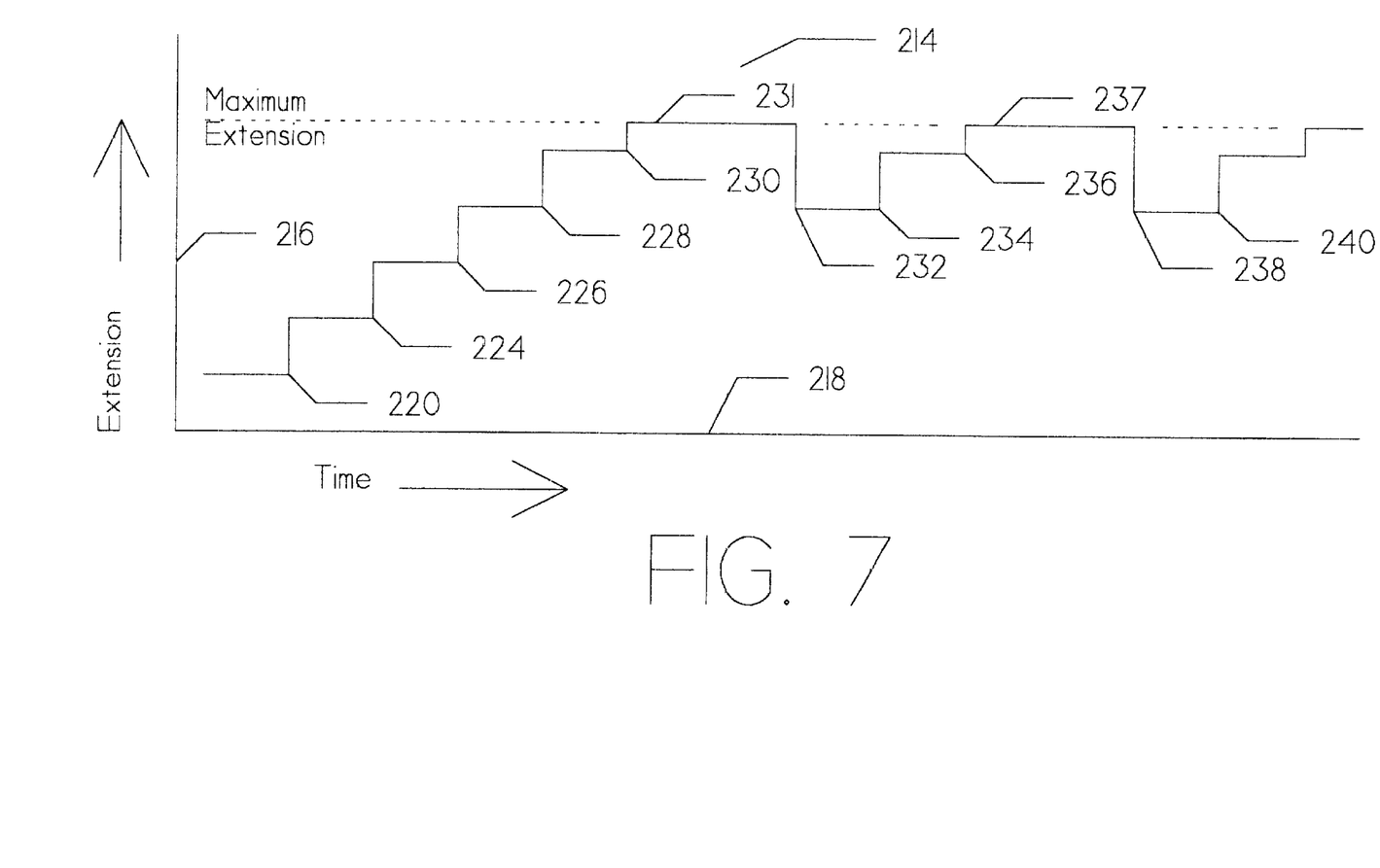
FIG. 7 is a chart graphically showing the operation of the stepper motor as the stepper approaches hard stop in the fully extended position.

FIG. 7 is a diagram 214 graphically showing the operation of the stepper motor powered, linear actuator main valve near and at the hard stop position. In accordance with the preferred mode of practicing the present invention, the main burner is modulated by a linear actuator which is positioned by a stepper motor, as explained in the above referenced and incorporated U.S. patent application Ser. No. 09/447,999, filed Nov. 23, 1999, and entitled, "STEPPER MOTOR DRIVING A LINEAR ACTUATOR OPERATING A PRESSURE CONTROL REGULATOR. In this approach, the valve is completely open at the point in which the linear actuator has made its greatest travel. This results in a hard stop. The characteristic stepper motor operation entails a fall back at this hard stop. It is important to determine this hard stop point empirically, to accommodate changes in manufacturing tolerances and operational environment, particularly temperature.

The abscissa 218 of diagram 214 represents time and the ordinate 216 represents position of travel. As the sequence of timing begins, the linear actuator is advanced by the stepper motor taking steps 220, 224, 226, and 228. Step 230 is not a complete step and step 231 does not move because the hard stop is reached. This results in the fall back at point 232. This fall back is one complete step and the partial step at the hard stop.

Step 234 is a complete step, but step 236 is only a partial step because the hard stop is again reached. Step 237 does not move, and the next step results in fall back to position 238. Again, this fall back is one complete step and a partial step. Step 240 is, of course, a complete step before the hard stop is again reached.

Figure 8:
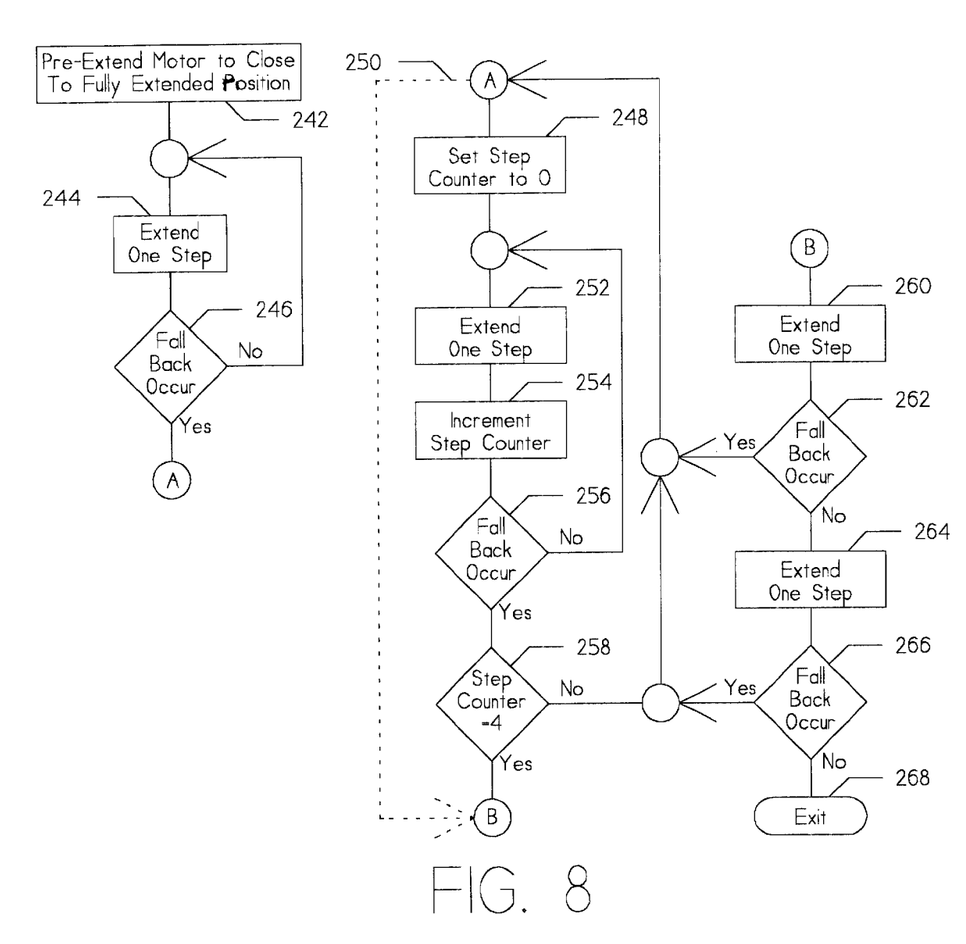
FIG. 8 is a flow chart for the microprocessor logic which determines the stepper fully extended position.

FIG. 8 is a detailed flow chart of the microprocessor logic which locates the linear actuator maximum travel hard stop from monitoring the energy induced within the unused coils of the stepper motor as explained above. Entry is via element 242. The first stepper motor increment is found at element 244. Element 246 determines whether a fall back has occurred. This is accomplished through the monitoring of the induced energy in the unused stepper motor coils as explained above. The fall back operation is illustrated at FIG. 5. Element 246 returns control to element 244 for incrementation of the stepper motor until element 246 senses a fall back and control proceeds with connector A.

Bypass path 250 is optionally available to eliminate the complete fall back phase confirmation. Otherwise, control is given to element 248 to initialize the event counter. Element 252 then energizes the stepper motor to extend the linear actuator by one position. The counter is incremented by element 254. Element 256 determines whether a fall back has occurred. If no, control is returned to element 252 for an additional iteration until the fall back is sensed.

After a fall back has been sensed by element 256 control is given to element 258 to determine whether the step counter has been incremented to four. If not control is returned to connector A for a complete re-execution of the process. After the counter reaches four, control is given to connector B for completion of the procedure.

From connector B, control is given to element 260 for extension by one step. Element 262 determines whether a fall back has occurred. If yes, control is returned to connector A for a repeat of the process. If no, element 264 extend by yet one more step. Again, if a fall back has occurred, element 266 returns control to connector A. If not, the linear actuator is determined to be in phase and at the maximum extension. Therefore, exit is via element 268.

Having thus described the preferred embodiments of the present invention, those of skill the art will be readily able to adapt the teachings found herein to yet other embodiments within the scope of the claims hereto attached.

We claim:

1. In a system having a main valve for controlling fuel delivery to a burner and having a flame, the improvement comprising:
   a. A linear actuator located within said main valve and having a maximum length of travel which controls fuel delivery via said main valve;
   b. A stepper motor having an energized winding and an unenergized winding responsively coupled to said linear actuator which positions said linear actuator;
   c. A first circuit responsively coupled to said energized coil of said stepper motor which causes partial rotation of said stepper motor;
   d. A second circuit responsively coupled to said unenergized winding of said stepper motor which determines rotational movement of said stepper motor based upon electrical energy induced within said unenergized winding;
   d. A third circuit responsively coupled to said first circuit and thermally coupled to said flame which converts energy from said flame into electrical energy to power said first circuit; and
   e. A fourth circuit responsively coupled to said second circuit which determines said maximum length of travel of said linear actuator based upon said determining of said second circuit.

2. The improvement of claim 1, wherein the first circuit energizes the first coil responsive to an increment signal; and wherein the fourth circuit provides a first increment signal to the first circuit, and based upon determinations of the second circuit resulting from movement of the stepper motor, provides a second increment signal to the first circuit.

3. The improvement of claim 2, wherein the second circuit includes circuitry whose determinations of rotational movement indicate stepper motor fallback.

4. The improvement of claim 3, wherein the fourth circuit includes a circuit using determinations of rotational movement by the second circuit indicating fallback to provide an indication of maximum length of travel of said linear actuator.

5. The improvement according to claim 1 wherein said second circuit further comprises logic which determines whether said stepper motor has experienced rotational motion analysis of said electrical energy.

6. The improvement according to claim 5 wherein said analysis determines direction of rotational motion of said stepper motor.

7. The improvement according to claim 6 wherein said system further comprises a gas appliance having a flame.

8. The improvement according to claim 7 wherein said third circuit powers said stepper motor.

9. An apparatus comprising:
   a. a main valve controlling fuel flow for a flame;
   b. a linear actuator within said main valve having a maximum length of travel;
   c. a stepper motor having an energized coil and an unenergized coil coupled to said linear actuator which positions said linear actuator;
   d. a logic circuit coupled to said stepper motor which controllably drives said stepper motor;
   e. wherein said logic circuit is responsively coupled to said unenergized coil; and
   f. wherein said logic circuit determines said maximum length of travel of said linear actuator.

10. An apparatus according to claim 9 wherein an electrical potential is induced into said unenergized coil by rotational motion of said stepper motor.

11. An apparatus according to claim 10 wherein said logic circuit further comprises a microprocessor.

12. An apparatus according to claim 11 further comprising a converter thermally coupled to said flame and electrically coupled to said stepper motor which convert converts energy from said flame to electrical energy which powers said stepper motor.

13. An apparatus according to claim 12 wherein said microprocessor interrupts said electrical energy from powering said stepper motor upon determining rotation of said stepper motor.

14. A method of limiting the electrical energy supplied to a stepper motor having an energized coil and an unenergized coil comprising:
   a. initiating supply of electrical energy to said energized coil of said stepper motor to cause rotational motion;
   b. monitoring said rotational motion of said stepper motor by analyzing an electrical potential induced in said unenergized coil during said rotational motion: and
   c. terminating said supply of electrical energy upon detection of said rotational motion.

15. A method according to claim 14 further comprising the step of:
   d. analyzing whether said rotational motion is clockwise or counterclockwise.

16. A method according to claim 15 wherein said monitoring step further comprises examining said electrical potential induced in said unenergized coil to determine rotational motion.

17. A method according to claim 16 wherein said analyzing step further comprises digitizing said electrical potential and processing said digitized electrical potential in a microprocessor.

18. A method according to claim 17 wherein said monitorzing step further comprises ascertaining whether said rotational motion is counter clockwise.

19. An apparatus comprising:
   a. means for initiating a flow of electrical energy;
   b. means coupled to said initiating means for converting said electrical energy into a stepped rotational motion;
   c. generating means responsively coupled to said producing means for generating an electrical potential in response to said rotational motion;
   d. means responsively coupled to said generating means for analyzing said electrical potential to determine said stepped rotational motion; and
   e. means responsively coupled to initiating means and said analyzing means for terminating said flow of electrical energy when said analyzing means determines said stepped rotational motion.

20. An apparatus according to claim 19 wherein said analyzing means further comprises an electronic circuit.

21. An apparatus according to claim 20 wherein said analyzing means further comprises an analog-to-digital converter responsively coupled to said generating means.

22. An apparatus according to claim 21 wherein said analyzing means further comprises a microprocessor.

23. An apparatus according to claim 22 wherein said generating means further comprises an unenergized coil.

24. A controller for controlling operation of a stepper motor, said stepper motor having a plurality of stator poles each with a drive winding, and an armature having at least two permanent magnet poles, said armature normally extending one step toward a hard stop position responsive to a drive pulse selectively applied to one of the drive windings, and falling back from the hard stop position responsive to a drive pulse selectively applied to one of the drive windings, each of said windings when not receiving a drive pulse, providing a sensing pulse in association with a drive pulse indicative of armature movement and direction, wherein the controller includes
   a) a drive circuit providing a sequence of drive pulses to the drive windings moving the armature toward the hard stop position; and
   b) a sensor circuit receiving the sensing pulses and responsive to each drive pulse testing the sensing pulse, and responsive to a sensing pulse indicating a first fallback incident after applying a drive pulse to a winding selected to extend the armature toward the hard stop position, providing a hard stop signal indicating that the armature has reached the hard stop position.

25. The controller of claim 24, wherein the sensor circuit provides the hard stop signal responsive to a first sensing pulse indicating fallback followed by at least one drive pulse indicating armature movement toward the hard stop followed by a second sensing pulse indicating fallback.

26. The controller of claim 25, wherein the sensor circuit, responsive to a plurality of drive pulses associated with an absence of sensing pulses followed by a sensor pulse indicating fallback, provides the hard stop signal responsive to a first sensing pulse indicating fallback followed by at least one drive pulse indicating armature movement toward the hard stop followed by a second sensing pulse indicating fallback.

* * * * *